(12) United States Patent
Constantinescu et al.

(10) Patent No.: US 8,468,135 B2
(45) Date of Patent: Jun. 18, 2013

(54) OPTIMIZING DATA TRANSMISSION BANDWIDTH CONSUMPTION OVER A WIDE AREA NETWORK

(75) Inventors: Mihail Corneliu Constantinescu, San Jose, CA (US); Joseph Samuel Glider, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 12/760,489

(22) Filed: Apr. 14, 2010

(65) Prior Publication Data

US 2011/0258161 A1    Oct. 20, 2011

(51) Int. Cl.
   *G06F 7/00* (2006.01)
   *G06F 17/00* (2006.01)
(52) U.S. Cl.
   USPC .......................................... 707/640
(58) Field of Classification Search
   USPC .......................................... 709/236; 707/640
   See application file for complete search history.

(56) References Cited

U.S. PATENT DOCUMENTS

| | | | |
|---|---|---|---|
| 5,442,752 A | 8/1995 | Styczinski | |
| 5,678,024 A | 10/1997 | Wagar et al. | |
| 5,778,395 A * | 7/1998 | Whiting et al. | 1/1 |
| 6,463,447 B2 * | 10/2002 | Marks et al. | 715/234 |
| 6,535,518 B1 * | 3/2003 | Hu et al. | 370/401 |
| 6,785,768 B2 * | 8/2004 | Peters et al. | 711/112 |
| 7,076,553 B2 | 7/2006 | Chan et al. | |
| 7,457,934 B2 | 11/2008 | Yagawa | |
| 7,457,980 B2 | 11/2008 | Yang et al. | |
| 7,472,242 B1 | 12/2008 | Deshmukh et al. | |
| 2005/0055435 A1 * | 3/2005 | Gbadegesin et al. | 709/224 |
| 2006/0196950 A1 * | 9/2006 | Kiliccote | 235/494 |
| 2006/0248273 A1 * | 11/2006 | Jernigan et al. | 711/114 |
| 2008/0244172 A1 | 10/2008 | Kano | |
| 2009/0013140 A1 | 1/2009 | Bondurant et al. | |
| 2009/0089612 A1 * | 4/2009 | Mathew et al. | 714/6 |
| 2009/0113145 A1 * | 4/2009 | Slater et al. | 711/154 |
| 2009/0300321 A1 | 12/2009 | Balachandran et al. | |
| 2010/0088296 A1 * | 4/2010 | Periyagaram et al. | 707/705 |

OTHER PUBLICATIONS

Otoo, E. et al., "Optimal File-Bundle Caching Algorithms for Data-Grids", Proceedings of the 2004 ACM/IEEE Conference on Supercomputing, Mar. 2004, 11 pages.

(Continued)

*Primary Examiner* — Shyue Jiunn Hwa
*Assistant Examiner* — Muluemebet Gurmu
(74) *Attorney, Agent, or Firm* — Mohammed Kashef

(57) ABSTRACT

An exemplary embodiment includes partitioning a data message to be communicated from a first data site to a second data site into data chunks; generating a data chunk identifier for each data chunk; determining whether the data chunks are stored at the second data site; when at least one data chunk is not stored at the second data site, adding the data chunk identifier for each data chunk not stored at the second data site to a data structure at the first data site; sending a transformed data message from the first date site to the second data site; wherein, when at least one data chunk is already stored at the second data site, rather than including that data chunk, the transformed data message instead includes at least one tuple to enable the data message to be reconstructed at the second data site without sending the previously stored data chunk, the transformed data message also includes each data chunk not stored at the second data site.

22 Claims, 11 Drawing Sheets

OTHER PUBLICATIONS

Rodriguez, P. et al., "Dynamic Parallel Access to Replicated Content in the Internet", IEEE ACM Transactions on Networking, vol. 10, No. 4, Aug. 2002, pp. 455-465.
Dean, J. et al., "MapReduce: Simplified Data Processing on Large Clusters", Communications of the ACM, Jan. 2008, vol. 51, No. 1, pp. 107-113.
Ghemawat, S. et al., "The Google File System", ACM SOSP, Oct. 2003, pp. 29-43.
Schmuck, F. et al., "GPFS: A Shared-Disk File System for Large Computing Clusters", Proc. of the FAST 2002 Conference on File and Storage Technologies, Monterey, California, Jan. 2002, pp. 231-244.
Tantisiriroj, W. et al., "Crossing the Chasm: Sneaking a Parallel File System into Hadoop", SC08 Petascale Data Storage Workshop, 2008. 1 page
Balachandran, S. et al., "Sequence of Hashes Compression in Data De-duplication", IEEE, 2008 Data Compression Conference, AN-9913194, p. 505.
Yang, T. et al., "FBBM: A new Backup Method with Data De-duplication Capability", IEEE, 2008 International Conference on Multimedia and Ubiquitous Engineering, AN-9962729, pp. 30-35.
Jin, K. et al., "The Effectiveness of Deduplication on Virtual Machine Disk Images", ACM, SYSTOR 2009 May 2009, Haifa, Israel, 12 pages.
Storer, M.W. et al., "Secure Data Deduplication", ACM, StorageSS '08, Oct. 31, 2008, Fairfax, Virginia, USA, pp. 1-10.
Constantinescu, C., "Compression for Data Archiving and Backup Revisited", Proc. of SPIE, vol. 7444, pp. 74440C-1 to 74440C-12, 2009.

* cited by examiner

400

| Hash 1 402 | Link 1 404 |
|---|---|
|  |  |
|  |  |
| Hash 2 406 | Link 2 408 |
|  |  |
| Hash 3 410 | Link 3 412 |

| Hash 1 452 | Link 1 454 | Chunk Offset 456 |
|---|---|---|
|  |  |  |
|  |  |  |
| Hash 2 458 | Link 2 460 | Chunk Offset 462 |
|  |  |  |
| Hash 3 464 | Link 3 466 | Chunk Offset 468 |

FIG. 4B

OPTIMIZING DATA TRANSMISSION BANDWIDTH CONSUMPTION OVER A WIDE AREA NETWORK

FIELD OF THE INVENTION

Embodiments of the invention relate to the field of data storage, and in particular, optimizing data communication bandwidth consumption over a wide area network.

BACKGROUND

Data is typically stored on computing systems and/or attached storage devices. The data may include operating system data, file system data, and application data. Data may be lost due to system failure or human error. Frequently, a backup copy of data is made to enable a data restore from the backup copy if the primary copy data is lost, corrupted or becomes inconsistent.

In a typical data backup architecture, a backup client obtains data that is to be backed up, and sends the data to a backup server. The backup server then stores the data on a storage device, such as a hard disk drive or tape. The backup client can restore data upon the occurrence of data loss or system failure with a backup copy of the data. When retrieving the backup copy of the data, the backup server obtains the data from the storage device and sends the data to the backup client. The data is returned to a prior satisfactory state upon completion of a successful data restore.

There are several different types of backups that may be performed. A full data backup copies the entire contents of a system. An incremental data backup copies all data updated since the previous incremental backup. A differential data backup copies all data updated since the previous full backup.

Network bandwidth is a measure of available or consumed data communication resources. Bandwidth refers to capacity or maximum throughput of a logical or physical communication path in a communication system. Bandwidth consumption refers to the utilization of the communication path's capacity to communicate data between two nodes.

BRIEF SUMMARY

Embodiments of the invention relate optimizing data transmission bandwidth consumption over a wide area network. An aspect of the invention includes a method for optimizing data transmission bandwidth consumption over a wide area network. The method may include partitioning a data message to be communicated from a first data site to a second data site into a plurality of data chunks; generating a data chunk identifier for each of the plurality of data chunks; determining whether the plurality of data chunks are stored at the second data site; when at least one data chunk is not stored at the second data site, adding the data chunk identifier for each data chunk not stored at the second data site to a data structure at the first data site; and sending a transformed data message from the first date site to the second data site, wherein the transformed data message may include: when at least one of the plurality of data chunk is stored at the second data site, at least one tuple, wherein the at least one tuple is to be used to reconstruct the data message, and when at least one data chunk is not stored at the second data site, the at least one data chunk not stored at the second site.

Another aspect of the invention includes a method for optimizing data transmission bandwidth consumption over a network. The method may include receiving a transformed data message at a second data site; and when the transformed data message comprises at least one data chunk, generating a data chunk identifier for each data chunk in the transformed data message, adding the data chunk identifier for each data chunk in the transformed data message to a data structure at the second data site, and storing each data chunk in the transformed message in a storage repository at the second data site.

Another aspect of the invention includes a system for optimizing data transmission bandwidth consumption over a wide area network. The system may comprise a data structure at a first data site configured to store a plurality of data chunk identifiers; and a data deduplication node at the first data site, the deduplication node may include a data partition module configured to partition a data message to be communicated from the first data site to a second data site into a plurality of data chunks, a data chunk identifier generation module coupled to the data partition module and configured to generate a data chunk identifier for each of the plurality of data chunks, a determination module coupled to the data chunk identifier generation module and configured to determine whether the plurality of data chunks are stored at the second data site, a data structure management module coupled to the determination module and configured to add the data chunk identifier for each data chunk not stored at the second data site to the data structure at the first data site when at least one of the plurality of data chunk is not stored at the second data site, and a transmission module coupled to the data structure management module and configured to send a transformed data message from the first date site to the second data site, wherein the transformed data message may include when at least one data chunk is stored at the second data site, at least one tuple, wherein the at least one tuple is to be used to reconstruct the data message, and when at least one data chunk is not stored at the second data site, the at least one data chunk not stored at the second site.

Another aspect of the invention includes a computer program product for optimizing data transmission bandwidth consumption over a wide area network. The computer program product may include a computer readable storage medium having computer readable program code embodied therewith, the computer readable program code may include: computer readable program code configured to partition a data message to be communicated from a first data site to a second data site into a plurality of data chunks, computer readable program code configured to generate a data chunk identifier for each of the plurality of data chunks, computer readable program code configured to determine whether the plurality of data chunks are stored at the second data site, computer readable program code configured to add the data chunk identifier for each data chunk not stored at the second data site to a data structure at the first data site, when at least one data chunk is not stored at the second data site; and computer readable program code configured to send a transformed data message from the first date site to the second data site, wherein the transformed data message may include: when at least one data chunk is stored is stored at the second data site, at least one tuple, wherein the at least one tuple is to be used to reconstruct the data message, and when at least one data chunk is not stored at the second data site, the at least one data chunk not stored at the second site.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which:

FIG. 4a illustrates a data structure at a first data site for storing a plurality of data chunk identifiers, according to one embodiment;

FIG. 4b illustrates a data structure at a second data site for storing a plurality of data chunk identifiers, according to one embodiment;

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of managing stored objects, as well as operation and/or component parts thereof. While the following description will be described in terms of backup/archive processes and devices to place the invention in context on an exemplary embodiment, it should be kept in mind that the teachings, including the claims, herein may have broad application to other types of systems, devices and applications, including systems, devices and applications in cloud computing environments.

Legacy backup systems typically work close in physical proximity to the devices that produce and use the data to be backed up or restored. The legacy backup systems are connected to devices either with a direct connection or over a local area network (LAN). More recently, backup and restore operations are being performed remote from the production systems they backup (e.g. over a Wide Area Network (WAN)). Network bandwidth is an important commodity. Accordingly, optimizing bandwidth consumption is beneficial. In certain scenarios, such as cloud computing, to perform backup and restore operations remotely over a WAN efficiently within a service level agreement (SLA), optimizing bandwidth consumption is needed.

Figure 1:
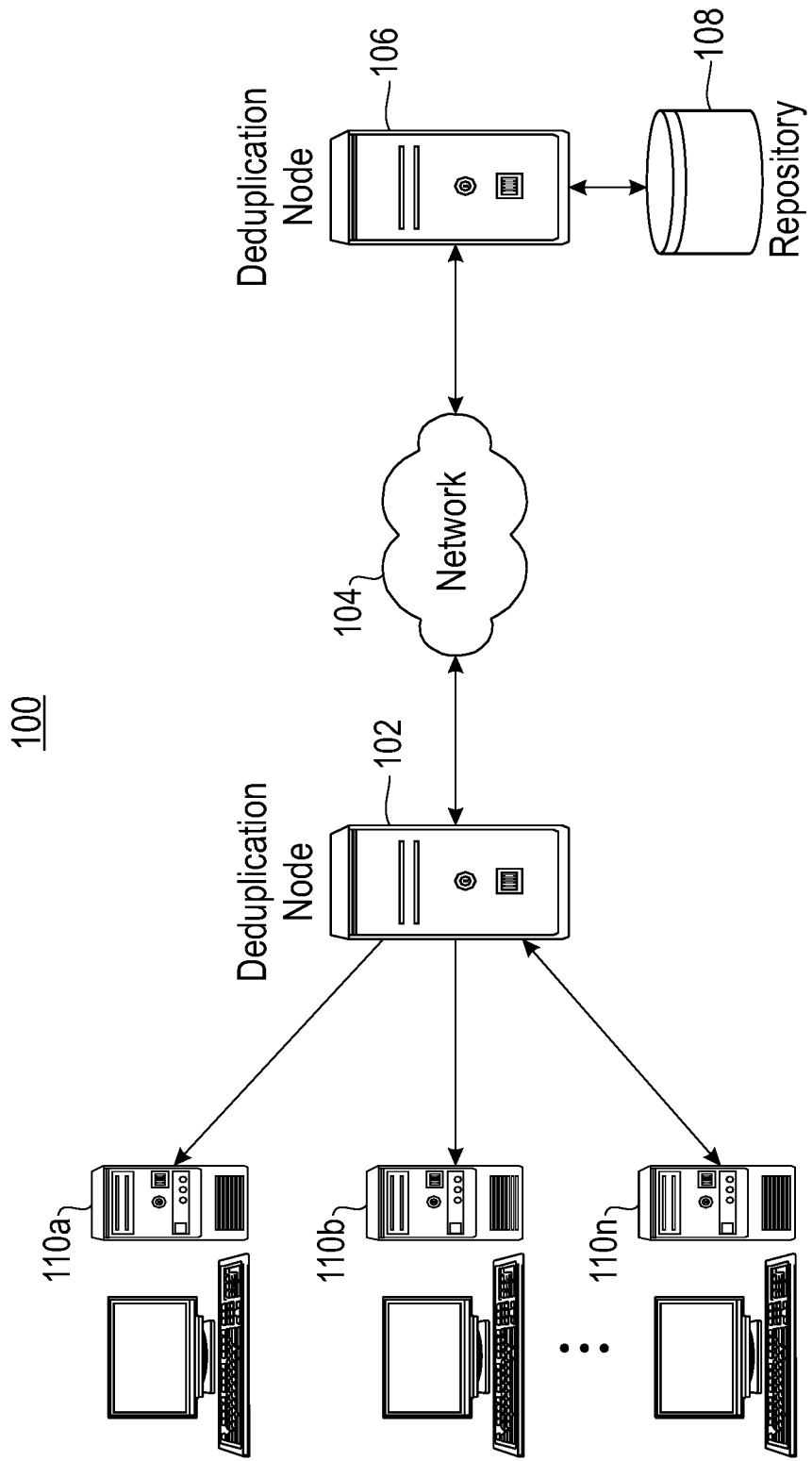
FIG. 1 illustrates a system for optimizing data communication bandwidth consumption over a wide area network, according to one embodiment.

FIG. 1 illustrates a system for optimizing data communication bandwidth consumption over a wide area network, according to one embodiment. The system 100 includes a data deduplication node 102 at a first data site, a network 104, a data deduplication node 106 at a second data site, a storage repository 108, and client computing nodes 110a, 110b . . . 110n. The data deduplication node 102 at the first data site is coupled to the data deduplication node 106 at the second data site over network 104. The client computing nodes 110a, 110b . . . 110n are coupled to the data deduplication node 102. The storage repository 108 is coupled to the deduplication node 106 at the second data site.

Embodiments of the invention optimize data communication bandwidth consumption over a network, such as the one shown in FIG. 1. Hash tables are used and maintained consistent at two different data sites to optimize bandwidth consumption when transmitting data between the two data sites. Accordingly, embodiments of the invention backup, restore, or reconstruct a data message at a second data site using a subset of the data chucks or hashes that may otherwise be sent from the first data site to the second data site over the network.

In an exemplary embodiment, a data message to be transmitted from a first data site to a second data site is partitioned into data chunks at the first data site. A hash is generated for each of the partitioned data chunks. A hash table at the first data site is checked for the existence of each hash generated to determine if each of the partitioned data chunks is stored at the second data site. If a corresponding hash does not exist in the hash table at the first data site, the data deduplication node at the first data site concludes that data chunk is not stored at the second data site. For each of the partitioned data chunks concluded to be missing at the second data site, a hash is added to the hash table at the first data site. Hashes of data chunks in sequence are linked in the hash table in an order representing the sequence.

In an exemplary embodiment, a transformed data message is then sent from the first data site to the second data site. The transformed data message includes any new data chunks and a representation of any previously stored data chunks. The representation of previously stored data chunks is used to reconstruct the data message at the second data site. In one embodiment, the representation of previously stored data chunks includes at least one hash followed by a count of any hashes linked in the hash table. New data chunks are stored in a storage repository at the second data site. A hash is generated for each of the new data chunks in the transformed data message. Each hash is added to the hash table at the second data site. Hashes of data chunks in sequence are linked in the hash table at the second data site in an order representing the sequence.

Figure 2:
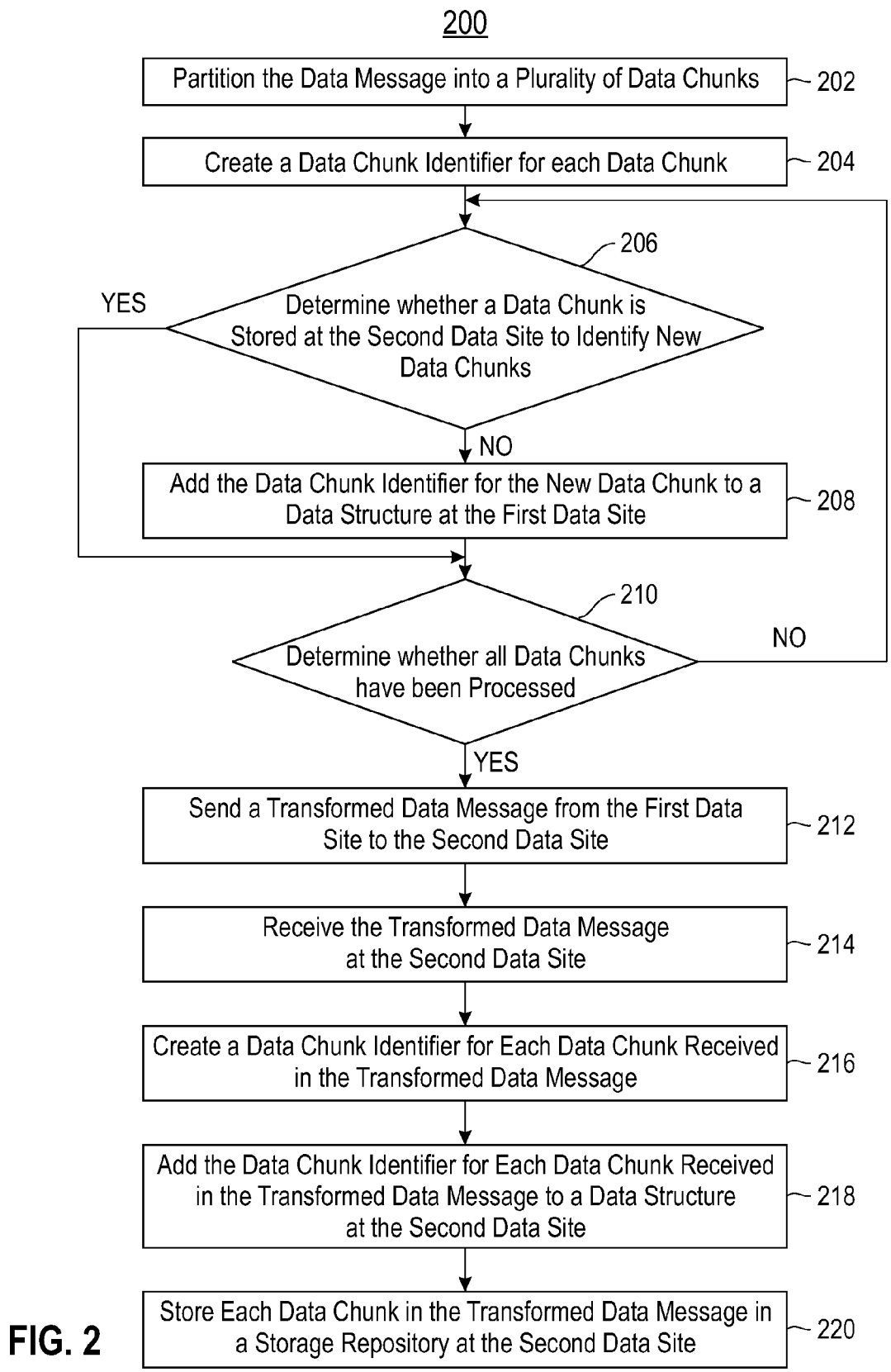
FIG. 2 illustrates a flow chart of a method for optimizing data communication bandwidth consumption over a wide area network, according to one embodiment.

FIG. 2 illustrates a flow chart of a method for optimizing data communication bandwidth consumption over a wide area network, according to one embodiment. At 202, the data message is partitioned into a plurality of data chunks. In one embodiment, the data deduplication node 102 at the first data site is configured to partition a data message to be communicated from the first data site to the second data site into a plurality of data chunks. For example, the data message may be a data file or a data stream. The data message is partitioned into one or more chunks using known chunking methods, (e.g., fixed-size chunking, content-aware chunking, content-agnostic chunking).

The data deduplication node 102 receives data messages from client computing nodes 110a, 110b . . . 110n. While three client computing nodes 110 are illustrated in FIG. 1, it is to be understood the client computing nodes may comprise 1 to "n" number of client computing nodes, where "n" equals any desired number of client computing nodes. The client computing nodes 110a, 110b . . . 110n are coupled to the data deduplication node 102 over a LAN, according to one exemplary embodiment. The client computing nodes 110a, 110b . . . 110n may be coupled to the data deduplication node 102 over a WAN (e.g., network whose communications links cross entity, metropolitan, regional, or national boundaries), according to another exemplary embodiment.

At 204, a data chunk identifier is created for each data chunk. For example, in FIG. 1, the data deduplication node 102 at the first data site may be configured to generate a data chunk identifier for each data chunk. The data chunk identifier may be or include a hash value or an integer. A hash value is a value returned by a hash function. A hash function is an algorithm that produces the hash value that is a "digital fingerprint" of the data chunk and uniquely identifies it. A hash is calculated for each chunk using any of several known hashing techniques (e.g., SHA hash functions)

Hashes of all chunks partitioned from the data message are compared for duplicates. Duplicate hashes mean either the data chunks are identical or there has been a hash collision. A hash collision occurs when different chunks produce the same hash. To prevent hash collisions, techniques such as bit-by-bit comparison may be performed. Hashes of unique chunks are stored at the first data site and hashes of all data chunks along with unique data chunks are sent to the second data site after the comparison of hashes and proof of their uniqueness. Chunks that are duplicates of already stored chunks are not stored at the first data site nor sent to the second data site; rather, such chunks are referenced by pointers to the already stored chunks.

At 206, whether a data chunk is stored at the second data site is determined to identify new data chunks. In one embodiment, to identify new data chunks, the data deduplication node 102 at the first site is configured to determine whether a data chunk partitioned from the data message is stored in storage repository 108 at the second data site. In one exemplary embodiment, determining whether the plurality of data chunks is stored at the second data site includes searching for each generated data chunk identifier in a data structure at the first data site. A data chunk is a new data chunk and not stored at the second data site if the corresponding data chunk identifier is not in the data structure at the first data site. The data structure may be or include a hash table, a lookup table, or a hash list, for example. In one exemplary embodiment, the data structure is a hash table.

If a data chunk is not stored in the repository 108 at the second data site, the method 200 proceeds to step 208. At 208, the data chunk identifier for the new data chunk is added to a data structure at the first data site. For example, in one embodiment, the data deduplication node 102 at the first data site is configured to add the data chunk identifier for each new data chunk to a data structure at the first data site. Each data chunk identifier in sequence is linked in the data structure in an order representing the sequence.

If the data chunk is stored at the second data site, the method 200 proceeds directly to step 210. At 210, whether all data chunks have been processed is determined. For example, in one embodiment, the data deduplication node 102 at the first data site determines whether the data chunks have been processed to identify all new data chunks. The method proceeds to step 212 if the data chunks partitioned from the data message have been processed. The method returns to step 206 if there are data chunks which have not been processed to identify new data chunks.

At 212, a transformed data message from the first data site is sent to the second data site. For example, in one embodiment, the data deduplication node 102 at the first site is configured to send a transformed data message from the first data site to the second data site. In an exemplary embodiment, the transformed data message includes an ordered series of tuples and an ordered set of the new data chunks.

In one exemplary embodiment, each tuple is a paired representation of a data chunk sequence. For example, each tuple may be or include a first data chunk identifier followed by a count of a plurality of linked data chunk identifiers. The linked data chunk identifiers correspond to data chunks which were partitioned from a data message in sequence. The data chunks identifiers in sequence are linked in the data structure in an order representing the sequence. In one exemplary embodiment, the count of the plurality of linked data chunk identifiers represents a number of data chunk identifiers linked in sequence in the data structure. For example, tuple ($H_1$, 2) may represent a first data chunk identifier, $H_1$, followed by the length of the sequence, 2. Accordingly, each tuple may be a first data chunk identifier and a sequence count, the sequence count representing an aggregate number of linked data chunk identifiers.

In an exemplary embodiment, the transformed data message is ordered to represent an order a data message was partitioned. For example, when the transformed data message includes at least two tuples, the tuples may be ordered in the transformed data message in an order corresponding to an order the plurality of data chunks were partitioned in the data message. When the transformed data message comprises at least two data chunks, the data chunks may be ordered in the transformed data message in an order corresponding to an order data chunks were partitioned in the data message. When the transformed data message includes at least one data chunk and at least one tuple, the at least one tuple and at least one data chunk may be ordered in the transformed data message in an order corresponding to an order the data chunks were partitioned in the data message.

At 214, the transformed data message is received at the second data site. For example, in FIG. 1, the data deduplication node 106 at the second data site may be configured to receive the transformed data message. At 216, a data chunk identifier is created for each data chunk received in the transformed data message. For example, in FIG. 1, the data deduplication node 106 at the second data site may be configured to create a data chunk identifier for each data chunk received in the transformed data message. At 218, the data chunk identifier for each data chunk received in the transformed data message is added to a data structure at the second data site. For example, in FIG. 1, the data deduplication node 106 at the second data site may be configured to add a data chunk identifier for each data chunk received in the transformed data message to a data structure at the second data site. Each data chunk identifier in sequence is linked in the data structure in an order representing the sequence.

At 220, each data chunk in the transformed data message is stored in a storage repository at the second data site, e.g., the storage repository 108. The storage repository 108 may be, for example, a network attached storage (NAS) device, a storage area network (SAN), system hard disk drive(s), or a direct-attached storage (DAS). In one exemplary embodiment, for a deduplication WAN transmission optimizer, the storage repository is a DAS. Each data chunk in the transformed data message is a data chunk not stored in the storage repository at the second data site.

According to one embodiment, sending the transformed data message from the first date site to the second data site is part of an operation to remotely host computing services at the second data site for the first data site, e.g., in cloud computing. Cloud computing is a computing paradigm that provides a scalable, virtualized infrastructure as a service, thereby, enabling the end-user to exploit the hosted computing resources on demand. In such an embodiment of the invention, the optimization techniques and/or system described above used to optimize data transfer from the first data site to the second data site when the second data site is configured to host remote computing services for the first data site.

Figure 3:
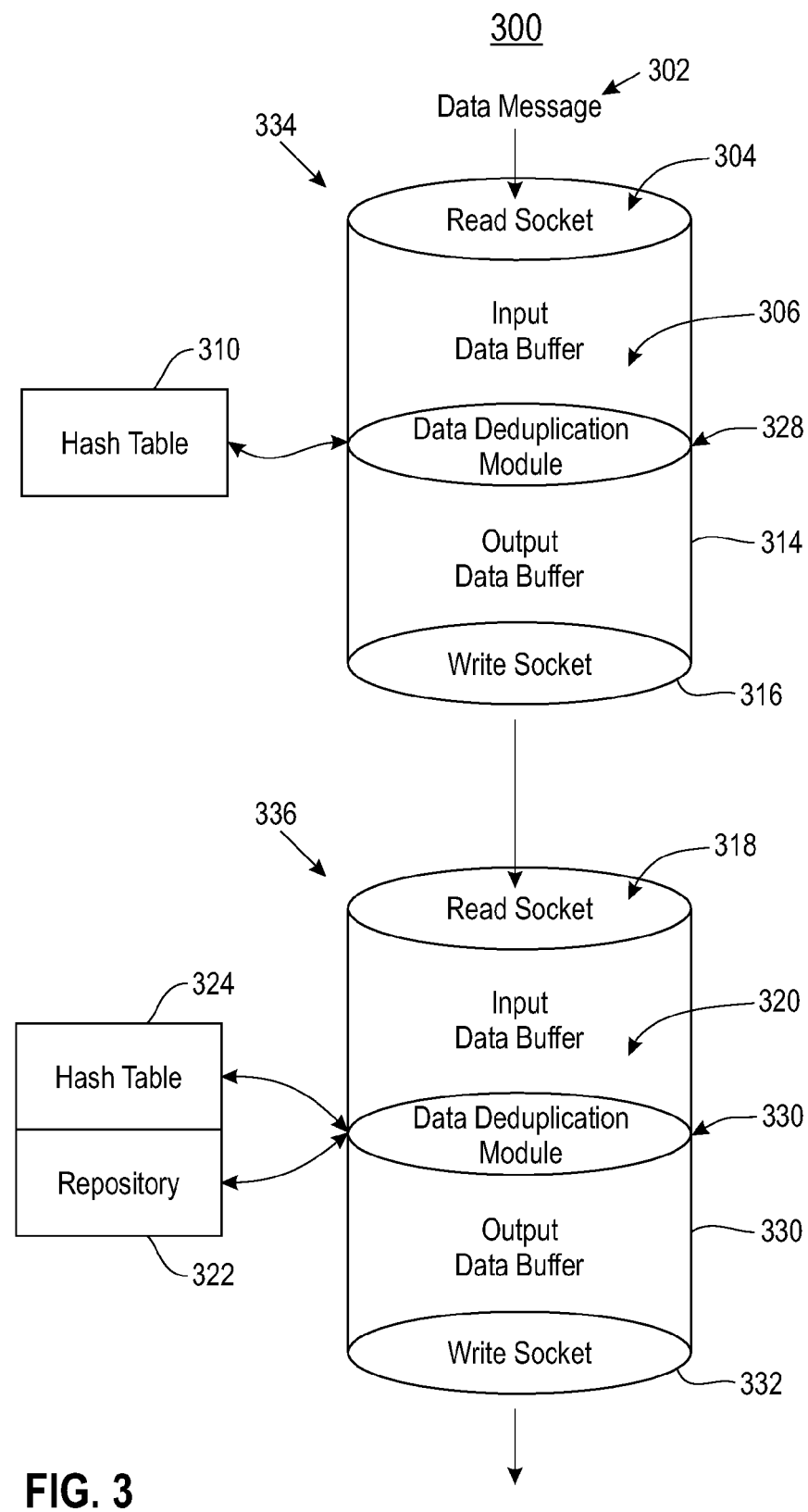
FIG. 3 illustrates a system architecture for optimizing data communication bandwidth consumption over a wide area network, according to one embodiment.

FIG. 3 illustrates a system architecture for optimizing data communication bandwidth consumption over a wide area network, according to one embodiment. The system 300 includes a data deduplication node 334 and a hash table 310 at a first data site. The data duplication node 334 includes a read socket 304, an input data buffer 306, a data duplication module 328, an output data buffer 314, and a write socket 316. The system 300 further includes a data deduplication node 336, a hash table 324, and repository 322 at a second data site. The data duplication node 336 includes a read socket 318, an input data buffer 320, a data deduplication module 330, an output data buffer 330, and a write socket 332. In FIG. 3, the data deduplication node 334 at the first data site and the data deduplication node 336 at the second data site communicate over a wide area network. In other embodiments, the nodes may communicate over other types of networks, e.g., a LAN, used for communications within one entity.

In use, the data deduplication node 334 at the first data site receives a data message 302 into read socket 304. The data deduplication node 334 reads the data message 302 from the read socket 304 into an input data buffer 306. The data deduplication module 328 determines whether the data message 302 should be deduplicated or should be sent to the server in pass-through mode, for example. The data message 302 is partitioned into data chunks of fixed size.

In an exemplary embodiment, the data message is read from input data buffer 306, by the data deduplication module 328, and partitioned into small fixed-size data chunks, approximately 4 Kb. In other embodiments, the data chunks may be of other fixed sizes, e.g., 512 bytes, 1K, or 2K. In other embodiments, the size of the data chunk may be variable. A hash table 310 is accessed to determine whether the data chunks are new or previously encountered and stored at the second data site. The data deduplication module 328 adds a header to the transformed data message indicating whether the message was deduplicated.

The data deduplication module 328 groups the new data chunks into the output data buffer 314 in the same order the new data chunks were received by the data deduplication module 328. In addition, the data deduplication module 328 builds in the output buffer 314 an ordered list of tuples describing the entire data message. For example, the data duplication module may build in the output buffer an ordered list of tuples that includes a first data chunk identifier and a count of the data chunks partitioned from the data message in an order linked in the data structure.

The resulting transformed data message is sent from the data deduplication node 334 at the first data site, e.g., from write socket 316, to the data deduplication node 336 at the second data site, e.g., over a wide area network. In FIG. 3, the transformed data message is received into the read socket 318 of the data deduplication node 336 at the second data site. The transformed data message is read into the input data buffer 320 of the data deduplication node 336 by read socket 318. A hash is computed for each new data chunk in the transformed data message and entered in the hash table 324. The hash for each new data chunk in the hash table 324 is linked in the order that the data message was partitioned. The new data chunks are stored in storage repository 322.

Multiple data messages 302 can be processed concurrently or serially. Deduplication modules 328 and 330 ensure ordered insertion of chunk identifiers and data chunks into hash tables 310 and 324, and repository 322, if multiple data messages 302 are processed concurrently.

FIG. 4a illustrates a data structure at a first data site for storing a plurality of data chunk identifiers, according to one embodiment. The data structure 400 is a hash table, according to one exemplary embodiment. The hash table 400 includes hash (data chunk identifier) for each corresponding data chunk stored in a storage repository. Specifically, in FIG. 4a, the hash table 400 includes Hash 1 402, Hash 2 406, and Hash 3 410. In addition to a hash, each entry also contains a link (pointer) to the next hash entry in the sequence. The links are linked in an order the data chunks were partitioned in the data message. In FIG. 4a, the links are denoted by link 1 404, link 2 408 and link 3 412. Link1 404, link2 08 and link3 412 represent a hash sequence of Hash 1 402, Hash 2 406, and Hash 3 410.

FIG. 4b illustrates a data structure at a second data site for storing a plurality of data chunk identifiers, according to one embodiment. The data structure 450 is a hash table, according to an exemplary embodiment. The hash table 450 includes a hash (data chunk identifier) for each corresponding data chunk stored in a storage repository. Specifically, the hash table 450 includes Hash 1 452, Hash 2 458 and Hash 3 464. The hash table 450 further includes, a data chunk location identifier for each data chunk in the storage repository (e.g., repository 108 or 322) denoted by Chunk offset 456, Chunk offset 462, Chunk offset 468. Each hash contains a link (pointer) to the next entry in the sequence. In FIG. 5b, these links, denoted by link 1 454, link 2 460 and link 3 466, represent a hash sequence of Hash 1 452, Hash 2 458, and Hash 3 464.

The hash table 400 and the hash table 450 are maintained consistent, wherein changes (insertions, deletions) at one side are identical and performed in the same order at the other side. Consistency of changes in the two data sites allows the deduplication node 106 at the second data site to be able to reconstruct the transformed data message. In one exemplary embodiment, the consistency maintained by the strict ordering rather than by the deduplication nodes 102 and 106 performing more expansive exchanges of messages to maintain consistency.

Figure 5A:
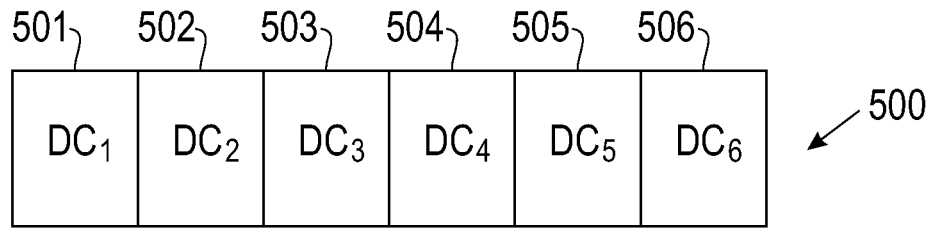
FIG. 5a through FIG. 5f illustrate exemplary transformed data messages, according to one embodiment.
Figure 5B:
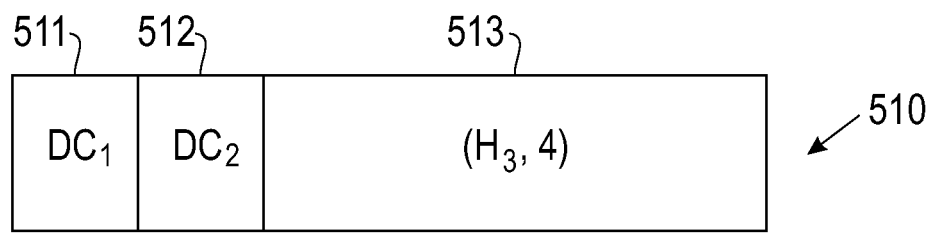

FIG. 5a through FIG. 5f illustrates exemplary transformed data messages, according to one embodiment. FIG. 5a illustrates an exemplary transformed data message 500 in an example case where all data chunks, $DC_1$ 501, $DC_2$ 502, $DC_3$ 503, $DC_4$ 504, $DC_5$ 505, $DC_6$ 506, from the partitioned data message are not already stored at the second data site. The transformed data message includes all data chunks $DC_1$ 501, $DC_2$ 502, $DC_3$ 503, $DC_4$ 504, $DC_5$ 505, $DC_6$ 506 from the partitioned data message because none of the data chunks are stored at the second data site.

FIG. 5B illustrates an exemplary transformed data message 510 in an example case where a partitioned data message has two data chunks not stored at the second data site followed by four data chunks stored at the second data site. The transformed data message 510 is ordered in an order the data message was partitioned. The transformed data message 510 includes data chunks $DC_1$ 511, $DC_2$ 512, and a tuple ($H_3$, 4) 513. The tuple ($H_3$, 4) 513 in the transformed data message 510 represents a hash of the third data chunk in the partitioned data message with a sequence count of the number of linked hashes which represent a fourth, fifth, and sixth data chunk from the partitioned data message.

Figure 5C:
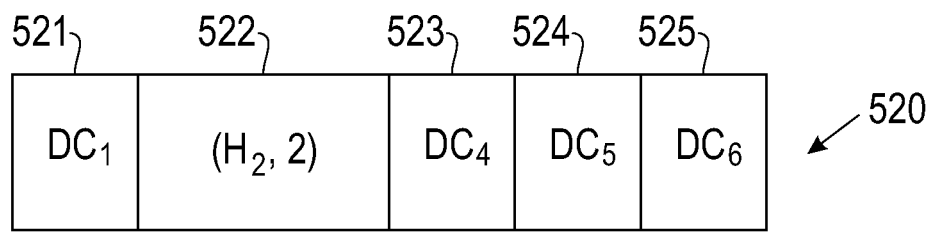

FIG. 5C illustrates an exemplary transformed data message 520 in an example case where a partitioned data message has a first data chunk not stored at the second data site followed by two data chunks stored at the second data site, and followed by three data chunks not stored at the second data site. The transformed data message 520 is ordered in an order the data message was partitioned. The transformed data message 520 includes data chunks $DC_1$ 521, a tuple ($H_2$, 2) 522, and data chunks $DC_4$ 523, $DC_5$ 524, and $DC_6$ 525. The tuple ($H_2$, 2) 522 in the transformed data message 520 represents a hash of the second data chunk in the partitioned data message with a sequence count of the number of linked hashes which represent a third data chunk from the partitioned data message. The transformed data message 520 is then followed by data chunks $DC_4$ 523, $DC_5$ 524, $DC_6$ 525, from the partitioned data message which are not stored at the second data site.

Figure 5D:
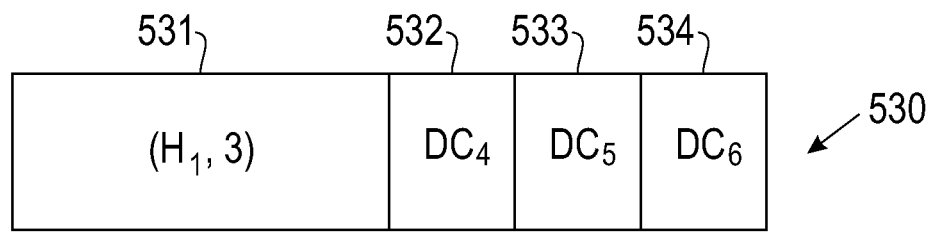

FIG. 5D illustrates an exemplary transformed data message 530 in the example case where a partitioned data message has three data chunks stored at the second data site proceeded by three data chunks not stored at the second data site. The transformed data message 530 is ordered in an order the data message was partitioned. The transformed data message 530 includes a tuple ($H_1$, 3) 531. The tuple ($H_1$, 3) 531 in the transformed data message 530 represents a hash of the first data chunk in the partitioned data message with a sequence count of the number of linked hashes which represent a second, third and fourth data chunk from the partitioned data message. The transformed data message 530 is then followed by data chunks $DC_4$ 532, $DC_5$ 533, $DC_6$ 534, from the partitioned data message which are not stored at the second data site.

Figure 5E:
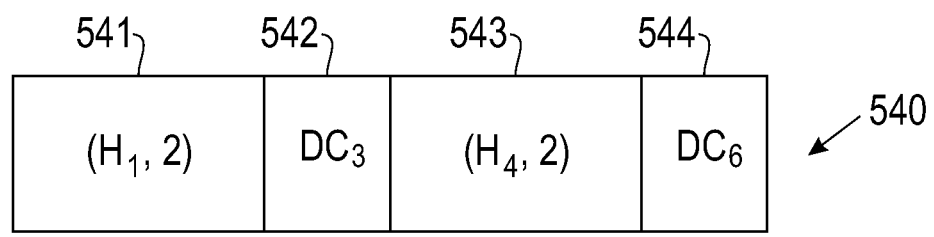

FIG. 5E illustrates an exemplary transformed data message 540 in the example case where a partitioned data message has a first and second data chunk stored at the second data site, followed by a data chunk not stored at the second data site, followed by a fourth and fifth data chunk stored at the second data site, and a sixth data chunk not stored at the second data site. The transformed data message 540 is ordered in an order the data message was partitioned. The transformed data message 540 includes a tuple ($H_1$, 2) 541 that represents a hash of the first data chunk in the partitioned data message with a sequence count of the number of linked hashes which represent a second data chunk from the partitioned data message. The tuple ($H_1$, 2) 541 is followed by data chunk $DC_3$ 542, from the partitioned data message which not stored at the second data site. Data chunk $DC_3$ 542 is followed by a tuple ($H_4$, 2) 543, the tuple ($H_4$, 2) 543 represents a hash of the fourth data chunk in the partitioned data message with a sequence count of the number of linked hashes representing a fifth data chunk from the partitioned data message. Tuple ($H_4$, 2) 543 is followed by data chunk $DC_6$ 544 which is not stored at the second data site in the transformed data message 540.

Figure 5F:

FIG. 5F illustrates an exemplary transformed data message 550 in the example case where a partitioned data message has six data chunks already stored at the second data site. The transformed data message 550 is represented by one tuple ($H_1$, 6) 551. The tuple ($H_1$, 6) 551 represents a hash of the first data chunk in the partitioned data message with a sequence count of the number of linked hashes which represent a second, third, fourth, fifth, and sixth data chunks from the partitioned data message. The transformed data message 550 does not include any data chunk because all data chunks in the partitioned data message are already stored at the second data site. The transformed data message 550 with the tuple ($H_1$, 6) 551 is sent to the second data site to enable reconstruction of the original data message.

Figure 6A:
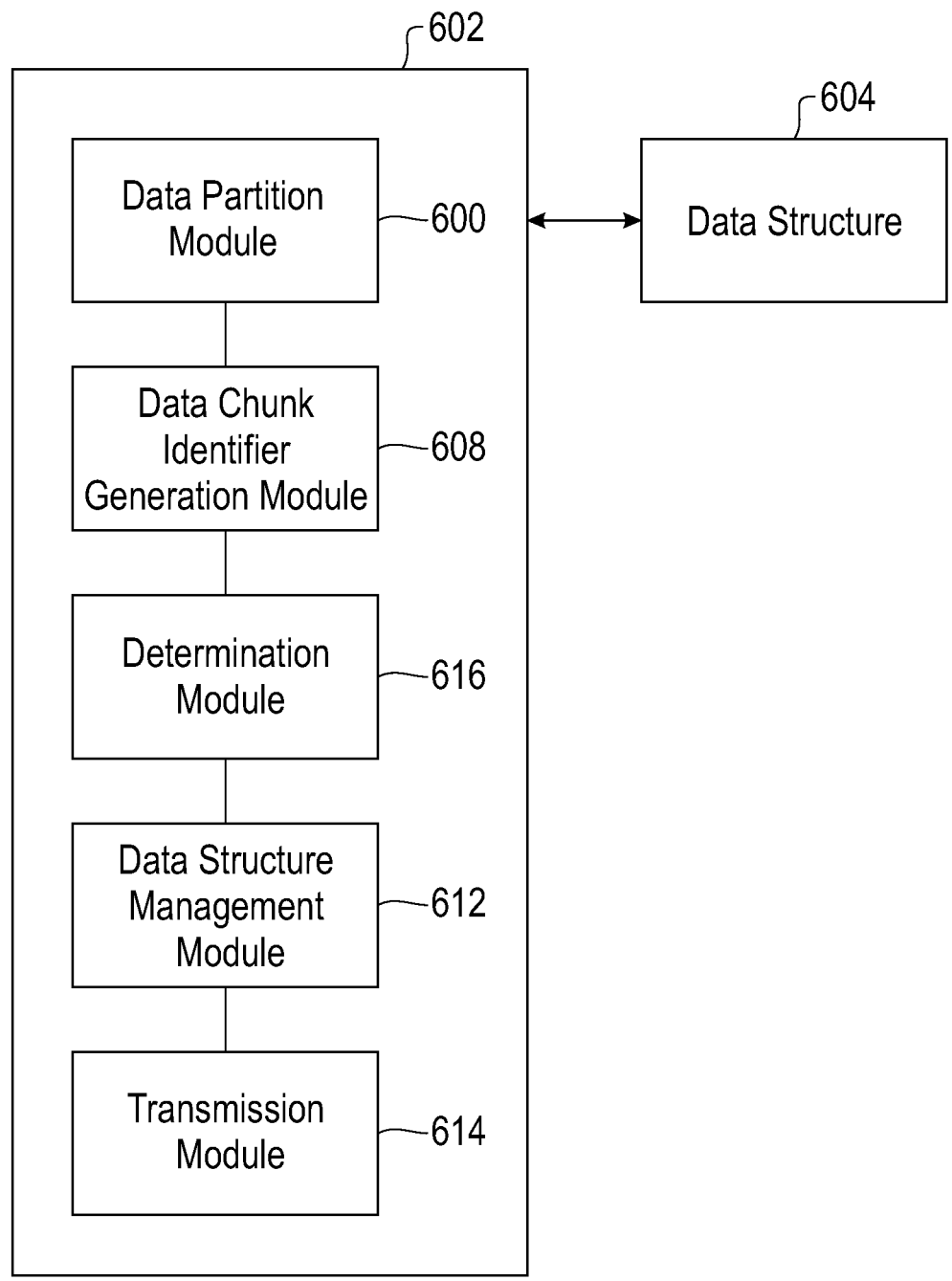
FIG. 6a illustrates a system at a first data site for optimizing data communication bandwidth consumption over a wide area network, according to one embodiment.

FIG. 6a illustrates a system at a first data site for optimizing data communication bandwidth consumption over a wide area network, according to one embodiment. The system 600 includes a data structure 604 at the first data site configured to map a plurality of data chunk identifiers to a plurality of data chunks. The system 600 further includes a data deduplication node 602 at the first data site coupled to the data structure 604 at the first data site.

The data deduplication node 602 illustrates software modules of data deduplication node 102 and data deduplication node 334. The data deduplication node 602 further includes a data partition module 606 configured to partition a data message to be communicated from the first data site to a second data site into a plurality of data chunks. The data deduplication node 602 further includes a data chunk identifier generation module 608 coupled to the data partition module 606. The data chunk identifier generation module 608 is configured to generate a data chunk identifier for each of the plurality of data chunks.

The data deduplication node 602 further includes a determination module 610 coupled to the data chunk identifier generation module 608. The determination module 610 is configured to determine whether the plurality of data chunks is stored at the second data site. The determination module 610 references data chunk identifiers in the data structure at the first data site, whereby if a data chunk identifier does not exist in data structure for a data chunk identifier generated by the data chunk identifier generation module 608, the data chunk represented by the data chunk identifier is not stored at the second data site.

The data deduplication node 602 further includes a data structure management module 612 coupled to the determination module 610. The data structure management module 612 is configured to add the data chunk identifier for each data chunk not stored at the second data site to the data structure 604 at the first data site when at least one of the pluralities of data chunk is not stored at the second data site.

In the embodiment shown in FIG. 6a, the data deduplication node 602 further includes a transmission module 614 coupled to the data structure management module 612. The transmission module 614 is configured to send a transformed data message from the first date site to the second data site. The transformed data message comprises at least one tuple when at least one data chunk is stored at the second data site. The at least one tuple is used at the second data site to reconstruct the data message. In an exemplary embodiment, the transformed data message further includes at least one data chunk, when the at least one data chunk is not stored at the second data site.

Figure 6B:
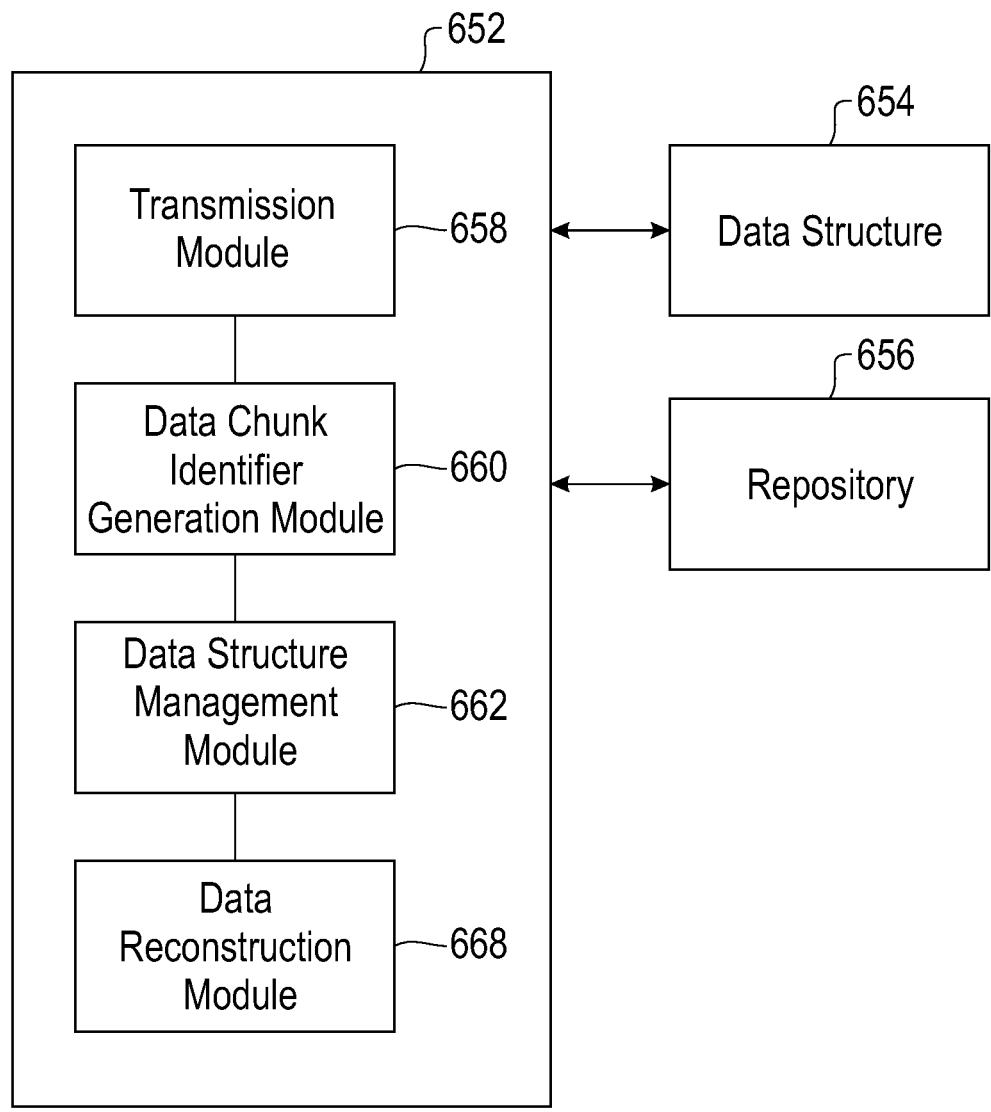
FIG. 6b illustrates a system at a second data site for optimizing data communication bandwidth consumption over a wide area network, according to one embodiment.

FIG. 6b illustrates a system at a second data site for optimizing data communication bandwidth consumption over a wide area network, according to one embodiment. The system 650 includes a data structure 654 at the second data site configured to map a plurality of data chunk identifiers to a plurality of data chunks. The data structure 654 may include, for example, hash table 450. The system 650 further includes a data deduplication node 652 at the second data site coupled to a deduplication node at a first data site, e.g., via a network. The system 650 further includes a storage repository 656 coupled to data deduplication node 652. The storage repository 656 is configured to store each data chunk in a transformed data message sent from a first data site to the second data site.

The data deduplication node 652 illustrates software modules of data deduplication node 106 and data deduplication node 336. The data deduplication node 652 includes a transmission module 658 configured to receive the transformed data message at the second data site. The data deduplication node 652 further includes a data chunk identifier generation module 660 coupled to the transmission module 658. The data chunk identifier generation module 660 is configured to generate a data chunk identifier for each data chunk in the transformed data message, for example, when the transformed data message comprises at least one data chunk. The data deduplication node 652 at the second data site includes a data structure management module 662 coupled to the data chunk identifier generation module 660. The data structure management module 662 is configured to add the data chunk identifier for each data chunk in the transformed data message to the data structure at the second data site.

The transformed data message is reconstructed at the second data site to allow the original data message to be accessed at the second data site, according to one exemplary embodiment. The data deduplication node further includes a data reconstruction module 668, according to one embodiment. The data reconstruction module 668 is coupled to the data structure management module at the second data site. The data reconstruction module 668 is configured to reconstruct the transformed data message at the second data site.

In an exemplary embodiment, when the transformed data message includes at least one data chunk, reconstructing the transformed data message at the second data site includes assembling at least one data chunk in the transformed data message into a reconstructed data message in an order the data chunk appeared in the transformed data message. When the transformed data message includes at least one tuple, reconstructing the transformed data message at the second data site may further include assembling at least one data chunk corresponding to at least one data chunk identifier in the tuple in the transformed data message into a reconstructed data message in an order the tuple appears in the transformed data message.

Figure 7:
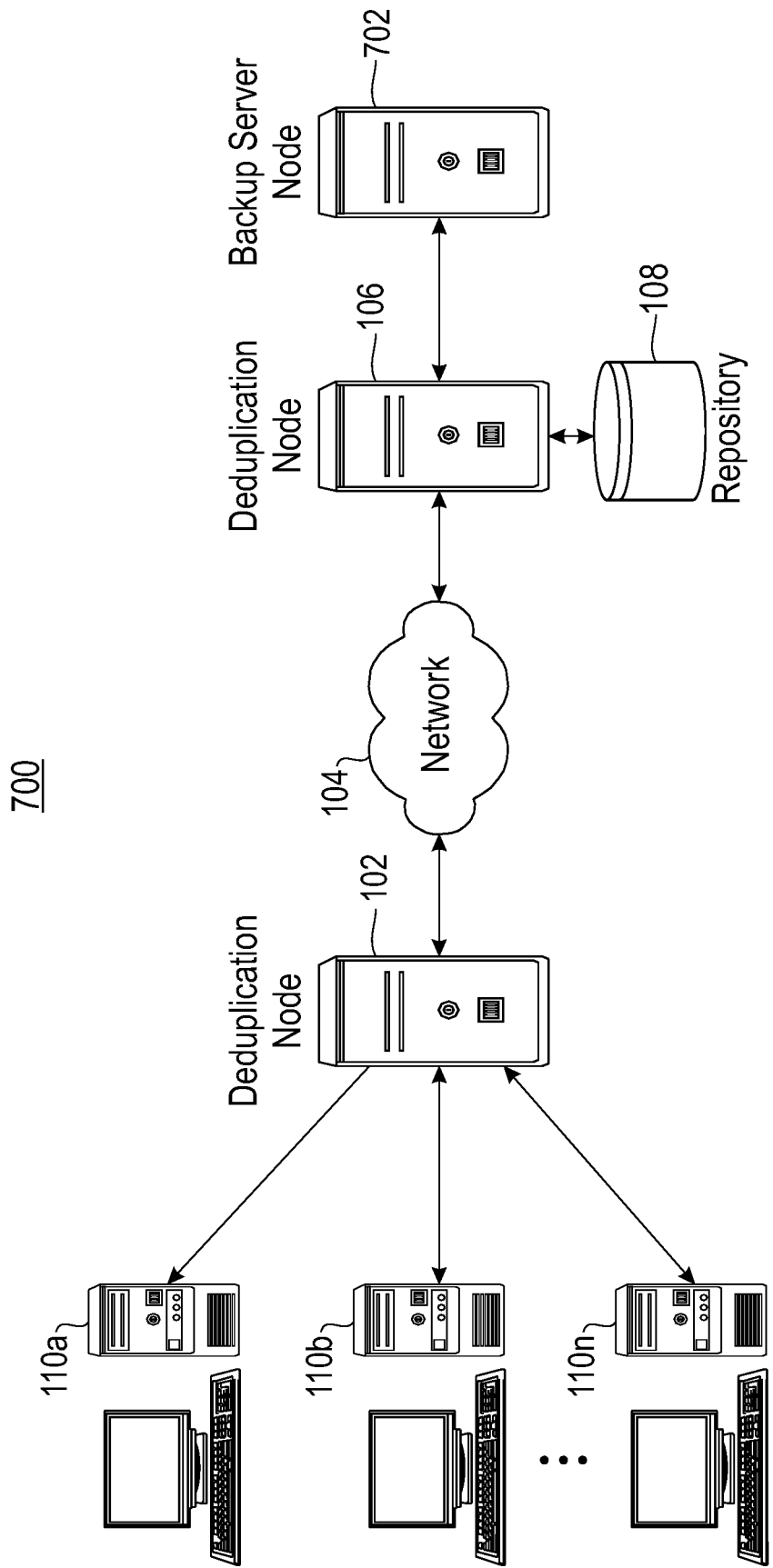
FIG. 7 illustrates a system for backing up data sent from a first data site to a second data site, according to one embodiment.

FIG. 7 illustrates a system for backing up data sent from a first data site to a second data site, according to one embodiment. The system 700 includes a backup server node 702. The backup server node 702 is coupled to the data deduplication node 106 at the second data site. The backup server node 702 is configured to backup data messages at the second data site stored in storage repository 108 and originating from the client computing nodes 110a, 110b . . . 110n at the first data site. In one embodiment, the backup server node 702 is directly coupled to the repository.

Figure 8:
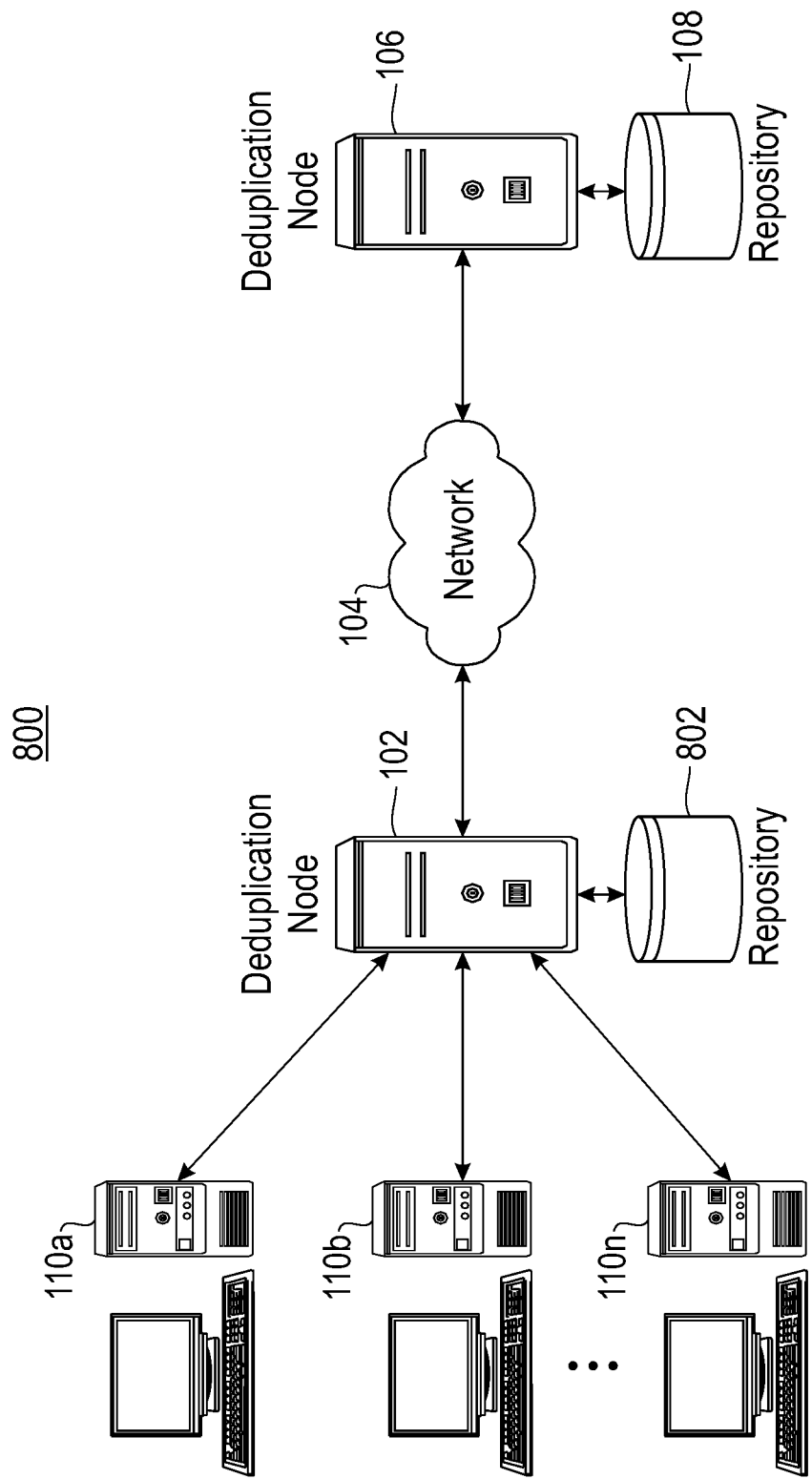
FIG. 8 illustrates a system for restoring data from a second data site to a first data site, according to one embodiment.

FIG. 8 illustrates a system for restoring data from a second data site to a first data site, according to one embodiment. The system 800 includes a storage repository 802 at the first data site. The repository 802 is coupled to the data deduplication node 102 at the first data site. In a restore operation, the deduplication node 106 at the second data site sends a transformed data message to the deduplication 102 at the first data site, for restoring the transformed data message at the first data site. The deduplication node 102 at the first data reconstructs the transformed data message to be restored at the first data site. The reconstructed data message is stored in storage repository 802. The restored data message is accessible by client computing node(s) 110a, 110b . . . 110n. System 800 has an additional functionality in that it may optimize bandwidth usage in both directions by using similar deduplication methods for transmitting data in more than one direction, rather than from just a first data site to a second data site.

Figure 9:
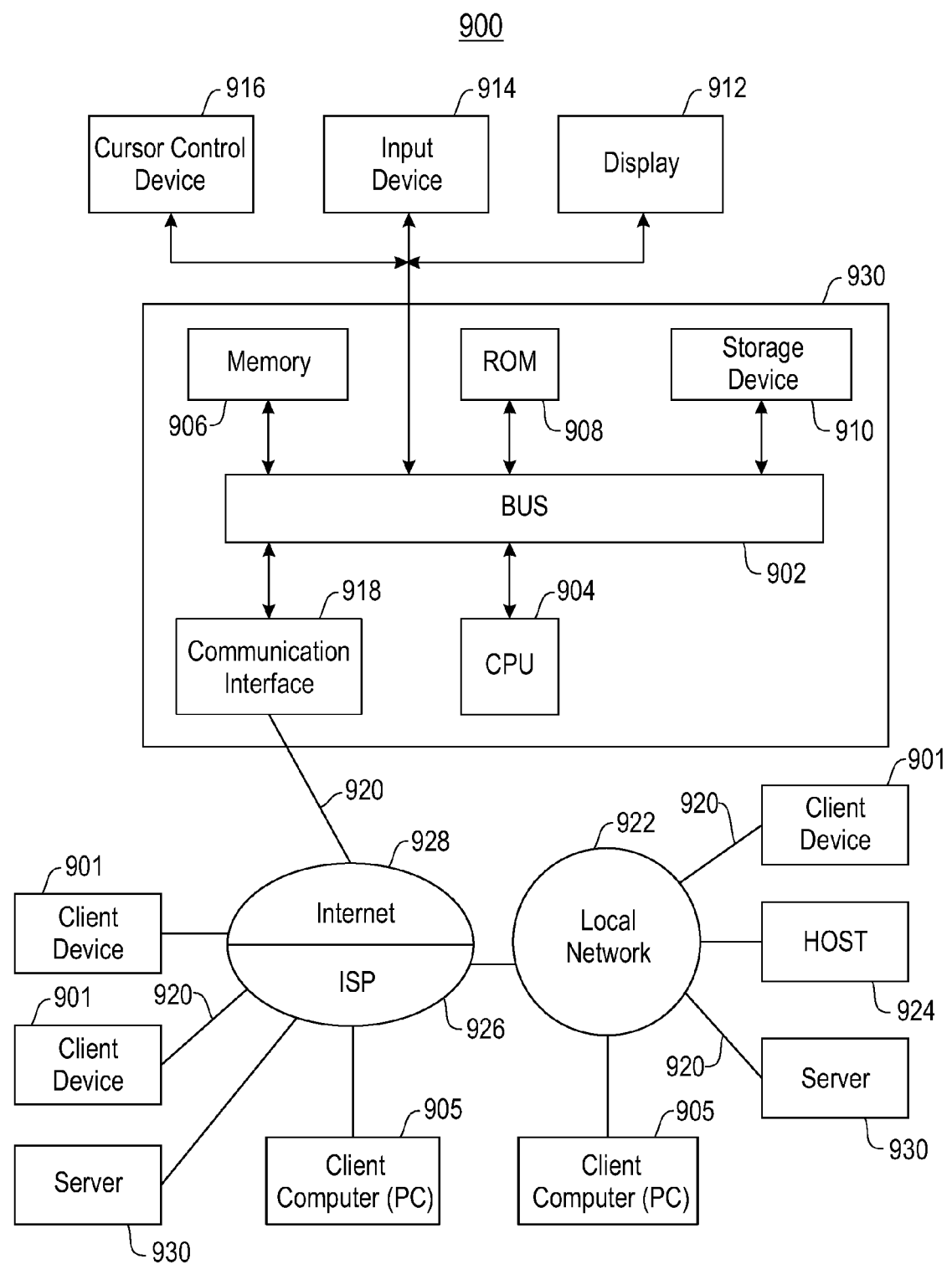
FIG. 9 illustrates a block diagram of a system in which a process for reducing data communication bandwidth consumption over a wide area network may be implemented, according to one embodiment.

FIG. 9 illustrates a block diagram of a system in which a process for reducing data communication bandwidth consumption over a wide area network may be implemented, according to one embodiment. The system 900 includes one or more client devices 901 connected to one or more server computing systems 930. A server 930 includes a bus 902 or other communication mechanisms for communicating information, and a processor (CPU) 904 coupled with the bus 902 for processing information. The server 930 also includes a main memory 906, such as a random access memory (RAM) or other dynamic storage device, coupled to the bus 902 for storing information and instructions to be executed by the processor 904. The main memory 906 also may be used for storing temporary variables or other intermediate information during execution or instructions to be executed by the processor 904.

The server computer system 930 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions. The bus 902 may contain, for example, thirty-two address lines for addressing video memory or main memory 906. The bus 902 can also include, for example, a 32-bit data bus for transferring data between and among the components, such as the CPU 904, the main memory 906, video memory and the storage 910. Alternatively, multiplex data/address lines may be used instead of separate data and address lines.

The server 930 may be coupled via the bus 902 to a display 912 for displaying information to a computer user. An input device 914, including alphanumeric and other keys, is coupled to the bus 902 for communicating information and command selections to the processor 904. Another type of user input device comprises cursor control 916, such as a mouse, a trackball, or cursor direction keys for communicating direction information and command selections to the processor 104 and for controlling cursor movement on the display 912.

The functions of the invention are performed by the server 930 in response to the processor 904 executing one or more sequences of one or more instructions contained in the main memory 906. Such instructions may be read into the main memory 906 from another computer-readable medium, such as the storage device 910. Execution of the sequences of instructions contained in the main memory 906 causes the processor 904 to perform the process steps described herein. One or more processors in a multi-processing arrangement may also be employed to execute the sequences of instructions contained in the main memory 906. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 904 for execution. For example, the instructions may initially be carried on a magnetic disk of a remote computer. The remote computer can load the instructions into its dynamic memory and send the instructions over a telephone line using a modem. A modem local to the server 930 can receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 906, from which the processor 904 retrieves and executes the instructions. The instructions received from the main memory 906 may optionally be stored on the storage device 910 either before or after execution by the processor 904.

The server 930 also includes a communication interface 918 coupled to the bus 902. The communication interface 918 provides a two-way data communication coupling to a network link 920 that is connected to the world wide packet data communication network now commonly referred to as the Internet 928. The Internet 928 uses electrical, electromagnetic or optical signals that carry digital data streams. The signals through the various networks and the signals on the network link 920 and through the communication interface 918, which carry the digital data to and from the server 930, are exemplary forms or carrier waves transporting the information.

In another embodiment of the server 930, interface 918 is connected to a network 922 via a communication link 920. For example, the communication interface 918 may be an integrated services digital network (ISDN) card or a modem to provide a data communication connection to a corresponding type of telephone line, which can comprise part of the network link 920. As another example, the communication interface 918 may be a local area network (LAN) card to provide a data communication connection to a compatible LAN. Wireless links may also be implemented. In any such implementation, the communication interface 918 sends and receives electrical electromagnetic or optical signals that carry digital data streams representing various types of information.

The network link 920 typically provides data communication through one or more networks to other data devices. For example, the network link 920 may provide a connection through the local network 922 to a host computer 924 or to data equipment operated by an Internet Service Provider (ISP) 926. The ISP 926 in turn provides data communication services through the Internet 928. The local network 922 and the Internet 928 both use electrical, electromagnetic or optical signals that carry digital data streams. The signals through the various networks and the signals on the network link 120 and through the communication interface 918, which carry the digital data to and from the server 930, are exemplary forms or carrier waves transporting the information.

The server 930 can send/receive messages and data, including e-mail, program code, through the network, the network link 920 and the communication interface 918. Further, the communication interface 918 can comprise of a USB/Tuner and the network link 920 may be an antenna or cable for connecting the server 930 to a cable provider, satellite provider or other terrestrial transmission system for receiving messages, data and program code from another source.

The example versions of the invention described herein may be implemented as logical operations in a distributed processing system such as the system 900 including the servers 930. The logical operations of the present invention can be implemented as a sequence of steps executing in the server 930, and, as interconnected machine modules, within the system 900. The implementation is a matter of choice and can depend on performance of the system 900 implementing the invention. As such, the logical operations constituting said example versions of the invention are referred to for e.g. as operations, steps or modules.

Similar to a server 930 described above, a client device 901 can include a processor, memory, storage device, display, input device and communication interface (e.g., e-mail interface) for connecting the client device to the Internet 928, the ISP 926, or LAN 922, for communication with the servers 930.

The system 900 can further include computers (e.g., personal computers, computing nodes) 905 operating the same manner as client devices 901, wherein a user can utilize one or more computers 905 to manage data in the server 930.

Generally, the term "computer-readable medium", as used herein, refers to any medium that participated in providing instructions to the processor 904 for execution. Such a medium may take many forms, including but not limited to, non-volatile media, volatile media and transmission media. Non-volatile media includes, for example, optical or magnetic disks, such as the storage device 910. Volatile media includes dynamic memory, such as the main memory 906. Transmission media includes coaxial cables, copper wire and fiber optics, including the wires that comprise the bus 902. Transmission media can also take the form of acoustic or light waves, such as those generated during radio wave and infrared data communications.

Thus, optimizing data communication bandwidth consumption over a network is disclosed. As will be appreciated by one skilled in the art, aspects of the present invention may be embodied as a system, method or computer program product. An aspect of the invention includes a computer program product for communicating a data message from a first data site to a second data site. The computer program product includes a computer readable storage medium having computer readable program code embodied therewith.

The computer readable program code includes a computer readable program code configured to partition the data message to be communicated from the first data site to the second data site into a plurality of data chunks. The computer readable program code further includes computer readable program code configured to create a data chunk identifier for each data chunk. The computer readable program code further includes a computer readable program code configured to determine whether the plurality of data chunks are stored at the second data site to identify new data chunks. The computer readable program code further includes a computer readable program code configured to add the data chunk identifier for each new data chunk to a data structure at the first data site linked in the order that data chunks were partitioned in the data message.

The computer readable program code further includes a computer readable program code configured to send a transformed data message from the first date site to the second data site. The transformed data message comprises an ordered series of tuples and an ordered set of the new data chunks. The computer readable program code further includes a computer readable program code configured to receive the transformed data message at the second data site. The computer readable program code further includes a computer readable program code configured to add a data chunk identifier for each new data chunk to a data structure at the second data site linked in the order that the data chunks were partitioned in the data message. The computer readable program code further includes a computer readable program code configured to store the new data chunks in a repository at the second data site.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a wide area network WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of reducing bandwidth consumption for data being sent between a client and server over a wide area network (WAN) by optimizing deduplication performance, the method comprising:

partitioning a data message into a plurality of data chunks, said message to be sent from a client at a first data site to a server at a second data site over a WAN;

generating a data chunk identifier (ID) for each of said chunks;

determining whether said chunks are stored at the second data site;

when at least one of said chunks is not stored at the second data site, adding said ID for each of said chunks not stored at the second data site to a data structure at the first data site;

when at least two data chunks partitioned from said message are in sequence and are not stored at the second data site, linking in the data structure at the first data site, the data chunk ID for each data chunk in sequence that are not stored at the second data site in an order corresponding to the sequence in said message; and sending a transformed data message from the first date site to the second data site, wherein said transformed message includes at least one tuple when at least one of said chunks is stored at the second data site and data chunks among said chunks that are not stored at the second data site, wherein said tuple: is a paired representation of data chunk sequence, is to be used to reconstruct said message, and includes a first data chunk ID and a sequence count that represents an aggregate number of linked data chunk IDs.

2. The method of claim 1, further comprising:
when said transformed message comprises at least two tuples, ordering the at least two tuples (in said transformed message) in an order corresponding to an order said chunks were partitioned from said message.

3. The method of claim 1, further comprising:
when said transformed message includes at least two data chunks, ordering the at least two data chunks (in said transformed message) in an order corresponding to an order said chunks were partitioned from said message.

4. The method of claim 1, further comprising:
when said transformed message includes at least one data chunk and at least one tuple, ordering the at least one tuple and the at least one data chunk (in said transformed message) in an order corresponding to an order said chunks were partitioned from said message.

5. The method of claim 1, wherein said determining includes searching for the data chunk ID generated for each of said chunks in the data structure at the first data site.

6. The method of claim 1, wherein said sending is performed as part of an operation to remotely host computing services at the second data site for the first data site.

7. The method of claim 1, wherein said sending backs up data from the first data site to the second data site.

8. A method of reducing bandwidth consumption for data being sent between a client and server over a wide area network (WAN) by optimizing deduplication performance, the method comprising:

receiving a transformed data message at a second data site, said transformed message: being previously sent from a client at a first data site to a server at the second data site over a WAN, created from data message partitioned into a plurality of data chunks, and includes data chunks from the data message not stored at the second data site and at least one tuple when at least one data chunk from the data message is stored at the second data site, wherein said tuple: is a paired representation of data chunk sequence, is to be used at the second data site to reconstruct said transformed, and includes a first data chunk ID and a sequence count that represents an aggregate number of linked data chunk IDs; and when said transformed message includes at least one data chunk: generating a data chunk identifier (ID) for each chunk in said transformed message, adding said ID for each chunk in said transformed message to a data structure at the second data site, and storing each chunk in said transformed message at the second data site; and reconstructing said transformed message at the second data site by:
when said transformed message includes at least one data chunk, assembling said at least one chunk into a reconstructed data message in an order corresponding to an order in said transformed message,
when said transformed message includes at least one tuple, assembling each chunk corresponding to a chunk ID referenced in the at least one tuple into said reconstructed message in an order the at least one tuple is in said transformed message.

9. The method of claim 8, further comprising:
performing a data restore from the second data site to a first data site using at least one data chunk from said transformed message stored at the second data site.

10. The method of claim 8, wherein said receiving is performed as part of an operation to remotely host computing services at the second data site for the first data site.

11. A system of reducing bandwidth consumption for data being sent between a client and server over a wide area network (WAN) by optimizing deduplication performance, the system comprising:

a storage repository at a first data site storing data chunks and a data structure includes data chunk identifiers of the stored data chunks; and a data deduplication node at the first data site that: (i) partitions a data message, to be sent from a client at the first data site to a sever at a second data site over a WAN, into a plurality of data chunks, (ii) generates a data chunk identifier (ID) for each of said chunks, determines whether said chunks are stored at the second data site, (iii) adds an ID for each data chunk not stored at the second data site to the data structure at the first data site, when at least one of said chunks that are not stored at the second data site, (iv) links in the data structure at the first data site, the data chunk ID for each data chunk in sequence that are not stored at the second data site, in an order corresponding to the sequence in said message when at least two data chunks partitioned from said message are in sequence and are not stored at the second data site, and (v) sends a transformed data message from the first date site to the second data site, wherein said transformed message includes at least one tuple when at least one of said chunks is stored at the second data site, and data chunks among said chunks that are not stored at the second data site, wherein said tuple: is a paired representation of data chunk sequence, is to be used to reconstruct said message, and includes a first data chunk ID and a sequence count that represents an aggregate number of linked data chunk IDs.

12. The system of claim 11, further comprising:
a storage repository at the second data site storing a data structure that includes data chunk identifiers and data chunks in said transformed message; and a data deduplication node at the second data site, in communication with the data deduplication node at the first site: receives said transformed message, generates a data chunk identifier (ID) for each data chunk in the transformed data message, when said transformed message includes at least one data chunk, and adds the ID for each data chunk in said transformed message to the data structure at the second data site.

13. The system of claim 11, further comprising:
at least one client computing node, in communication with the deduplication node at the first data site, that: sends a data message to be sent from the first data site to the second data site, and receives a data message to be sent from the second data site to the first data site.

14. The system of claim 11, further comprising:
a server computing node, in communication with the deduplication node at the second data site, that sends a data message to be restored from the second data site to the first data site using at least one data chunk in the transformed message stored at the second data site.

15. The system of claim 11, wherein said storage repository at the first data site stores data chunks to be restored from second data site to the first data site.

16. The system of claim 11, wherein said determines includes searching for the data chunk ID generated for each of said chunks in the data structure at the first data site.

17. The system of claim 12, wherein the deduplication node at the second data site reconstructs said transformed message, said includes:
when said transformed message includes at least one data chunk, assembling said at least one chunk into a reconstructed data message in an order corresponding to an order in said transformed message, and
when said transformed message includes at least one tuple, assembling each chunk corresponding to a chunk ID referenced in the at least one tuple into said reconstructed message in an order the at least one tuple is in said transformed message.

18. The system claim 12, wherein the second data site remotely hosts computing services for the first data site.

19. A computer program product of reducing bandwidth consumption for data being sent between a client and server over a wide area network (WAN) by optimizing deduplication performance, the computer program product comprising a computer readable storage medium having computer readable program code embodied therewith, wherein said program code upon being processed on a computer causes the computer to:
partition a data message into a plurality of data chunks, said message to be sent from a client at a first data site to a server at a second data site over a WAN;
generate a data chunk identifier (ID) for each of said chunks;
determine whether said chunks are stored at the second data site;
add said ID for each of said chunks not stored at the second data site to a data structure at the first data site, when at least one of said chunks is not stored at the second data site; and
link in the data structure at the first data site, the data chunk ID for each data chunk in sequence that are not stored at the second data site, in an order corresponding to the sequence in said message when at least two data chunks partitioned from said message are in sequence and are not stored at the second data site
send a transformed data message from the first date site to the second data site, wherein said transformed message includes at least one tuple when at least one of said chunks is stored at the second data site and data chunks among said chunks that are not stored at the second data site, wherein said tuple: is a paired representation of data chunk sequence, is to be used to reconstruct said message, and includes a first data chunk ID and a sequence count that represents an aggregate number of linked data chunk IDs.

20. The computer program product of claim 19, wherein said program code further causes the computer to:
receive said transformed message at the second data site;
generate an ID for each of said chunks in said transformed message and add each said ID to a data structure at the second data site when said transformed message includes at least one data chunk; and
store each data chunk in the transformed message.

21. The computer program product of claim 19, wherein said program code further causes the computer to:
reconstruct said transformed message at the second data site, wherein said reconstructing includes:
when said transformed message includes at least one data chunk, assembling said at least one chunk into a reconstructed data message in an order corresponding to an order in said transformed message, and
when said transformed message includes at least one tuple, assembling each chunk corresponding to a chunk ID referenced in the at least one tuple into said a reconstructed message in an order the at least one tuple is in said transformed message.

22. The method of claim 1, wherein said sending thereby optimizes deduplication performance such that the number of data chunk IDs sent and accesses needed to the data structure at the second data site, for reconstructing said message at the second data site, are minimized.

* * * * *